United States Patent [19]

Bodker

[11] Patent Number: 5,005,703
[45] Date of Patent: Apr. 9, 1991

[54] APPARATUS FOR INDIVIDUALIZED ANGULAR CONTAINMENT OF CRAWFISH

[76] Inventor: Edward Bodker, 364 Peachtree Blvd., Baton Rouge, La. 70806

[21] Appl. No.: 550,388

[22] Filed: Jul. 10, 1990

Related U.S. Application Data

[63] Continuation-in-part of Ser. No. 282,106, Dec. 8, 1988, abandoned.

[51] Int. Cl.$^5$ .................. B65D 1/36; A01K 61/00
[52] U.S. Cl. .................. 206/563; 43/55; 119/2; 206/205; 206/804; 220/507; 426/2; 426/119; 426/129
[58] Field of Search .................. 119/2, 3; 43/55; 206/205, 315.11, 557, 558, 562–564, 804; 220/507, 508; 426/2, 119, 124, 129

[56] References Cited

U.S. PATENT DOCUMENTS

| | | | |
|---|---|---|---|
| 1,639,555 | 8/1927 | Clark | 119/2 |
| 2,302,336 | 11/1942 | MacDonald | 119/2 |
| 2,316,607 | 4/1943 | MacDonald | 119/2 |
| 3,335,894 | 8/1967 | Laird | 220/508 |
| 3,392,902 | 7/1968 | Donovan | 426/124 X |
| 3,508,930 | 4/1970 | Bennett et al. | 426/119 X |
| 3,838,806 | 10/1974 | Dogliotti | 206/558 X |
| 4,007,709 | 2/1977 | Wishner | 119/2 |
| 4,357,902 | 11/1982 | Sheldon et al. | 119/2 |
| 4,559,902 | 12/1985 | Mason et al. | 119/2 |

*Primary Examiner*—Bryon P. Gehman
*Attorney, Agent, or Firm*—Pravel, Gambrell, Hewitt, Kimball & Krieger

[57] ABSTRACT

A container for use with live or fresh crawfish comprising an expansive support member carrying a plurality of sockets. Each socket having a continuous sidewall conforming generally to the shape of each crawfish, the sockets being spaced apart so that multiple crawfish can be stored within the dimensions of the horizontal member, separate from one another. Each socket includes a front end portion of gradually increasing width, a tail end portion, and a transverse trough that connects the tail portions of adjacent sockets sized so that the thumb and forefinger of a user can grip the tail of a stored crawfish by entering the trough.

10 Claims, 4 Drawing Sheets

APPARATUS FOR INDIVIDUALIZED ANGULAR CONTAINMENT OF CRAWFISH

CROSS REFERENCE TO RELATED APPLICATIONS

This is a continuation-in-part of copending U.S. patent application Ser. No. 07/282,106, filed Dec. 8, 1988, now abandoned, which is incorporated herein by reference.

BACKGROUND OF THE INVENTION

1. Field of the Invention

The present invention provides a method and container apparatus for the specialized packaging, shipping and storage of crawfish. This method and container is more particularly related to an improved container applicable to the soft shell crawfish industry and the fish bait industry wherein elongated open sockets hold an array of live or fresh crawfish in a vertical or diagonal position connected with a common horizontal member which maintains the separate sockets as a single unit.

2. General Background

The art of raising or storing live crustaceans separated one from another and maintained in a horizontal position is well established as the standard practice within the aquaculture industry. This is especially true with crustaceans such as shrimp, lobsters, and crawfish which have elongated body shapes. Crustaceans with elongated body shapes are easily recognized as having distinct head and tail regions. Unaided by a structural support, crawfish for example, will assume a natural posture in which their anterior and posterior ends become parallel to a horizontal plane such as a desk top, or floor. This natural horizontal posture has carried over to become the accepted optimum position within containers used to hold or house individually separated live crustaceans having elongated body shapes.

Seafood packaging employed for elongated crustaceans has developed according to three standard lines of basic use. Separate individual wrapping or packaging is one method. The basic retail or wholesale unit for singular packaging is usually relegated to species of elongated crustaceans such as lobsters which are relatively large. Larger species are those usually weighing more than two (2) ounces. Labor problems become excessive when singular packaging is used for smaller species of crustaceans such as crawfish or shrimp weighing less than two (2) ounces. These smaller species readily become too numerous for individual hand packing.

A second line of packaging is batch packaging in which a group of elongated crustaceans share a common container. Batch packaging is suited best for smaller species. Plastic bags, boxes, or trays are the basic retail or wholesale units for batch packaging.

Horizontal compartmentalized packaging is a third option, for packaging crustaceans. Although not used in the crawfish industry, such packaging has been employed for other seafood products such as clams and fish. Horizontal positioning in seafood packaging became the accepted norm for three basic reasons. The first reason horizontal positioning has become the accepted standard is visual presentation. Seafood such as shrimp and crawfish are most attractive and can be inspected most conveniently when displayed in their natural extended position. The second reason for horizontal orientation in traditional packaging is the ease of maintaining elongated crustaceans in a horizontal or flat position. Elevated off the horizontal plane, gravity tends to cause movement toward the bottom of a container. Such movement causes the tails of species similar to crawfish to fold under offering a less than optimum package presentation. A third reason that horizontal orientation in seafood packaging for elongated species is the simplicity for construction technique and associated cost for providing such a package.

Packaging which works well for other seafood products, does not meet the unique and specific needs of the complicated crawfish industry. The design and use of the present invention provides unique and specialized advantages which are, additionally, unrepresented by present methods for packaging crawfish. The present invention provides an improved packaging system for holding multiple live or fresh crawfish wherein the crawfish are oriented in a vertical or diagonal position. The angular (diagonal/vertical) presentation of crawfish in compartmentalized containers therefore becomes advantageous only for specialized reasons other than those recognized or solved by the aquaculture and seafood industries. During recent years the soft shell crawfish industry in particular and the crawfish industry in general have experienced rapid growth and a strong need for research and development. Many of the larger seafood companies have expressed concern and are reluctant to enter the soft shell crawfish industry because existing packaging methods are inconsistent and have many short comings. A search for an improved standardized packaging for soft shell crawfish has been and continues to be a significant issue for commercial seafood brokers, processors, producers and university research communities Three methods of packaging soft shell crawfish were used during the 1987-1988 crawfish season. The first method is individual wrapping. Soft shell crawfish packaged in this fashion were simply wrapped in a plastic film and frozen. Few people continue to use this method because of the excessive labor required for handling each crawfish in this manner. The second method consisted of a small container such as a plastic bag or a foam tray in which soft shell crawfish were collectively placed, covered or sealed and vacuumed into position, and then frozen. Vacuum packing during the 1987-1988 season was basically of an experimental nature and has yet to find its way into the market place. Vacuum packing requires expensive equipment.

The third and by far the most popular method of packaging soft shell crawfish is the zip-lock plastic bag method. During the 1987-1988 soft shell crawfish season, the zip lock bag method became the specified method which the major soft crawfish buyers directed their producers to use. Literature describing and advocating the zip-lock bag method was distributed by the Louisiana Cooperative Extension Service during the 1988 Louisiana Aquaculture Conference.

A bagging method consists of simply placing a given amount of soft shell crawfish (usually 1 lb.) in a plastic bag (for example a "Zip-Lock" type bag) along with a small amount of water. Most of the water is then squeezed out as the bag is sealed. The bag is then flattened and frozen in a thin rectangular or square shape. This method is convenient for the producer and the buyer, however, crawfish frozen in a solid block are not very attractive, not easily graded to a uniform size and become susceptible to damage during handling.

SUMMARY OF THE PRESENT INVENTION

The present invention was developed to provide three specific advantages. The first advantage is a reduction of labor required for individualized packaging. Individually pre-shaped compartments of an angular orientation allows the producer the convenience of packaging soft shell crawfish as or shortly after they are harvested. The container shape working in conjunction with gravity holds the live crawfish in uniform positions as they are conveniently placed in the individual chambers. Individualized pre-shaped compartments with a horizontal orientation does not provide this advantage.

The second specific advantage of the present invention relates to the ease in which the shape and directional orientation provides a convenient size grading mechanism. The producer can easily select the crawfish appropriate for a given package by comparing the crawfish to the size of the chamber openings. Once inside the angular chamber the crawfish assume a posture in which vertical movement is limited by gravity. Such crawfish are thus held uniformly so that the anterior end of the crawfish can be compared to a gradation point or mark near the opening of said chamber. The buyer has the advantage of determining at a glance that all the crawfish in a given package are of a uniform and known size. Current methods of batch packaging require the producer to check for size and weight by removing the crawfish from such packaging.

The third specialized advantage to angular chamber packaging is environmental control. Live crawfish when placed together in common batches are subject to damage due to movement and contact with other crawfish. Often claws are lost and the value of the product is diminished. Live crawfish when placed in the individual angular chambers of the present invention are provided protection as well as a mini environment to maintain health. The design of the present invention allows for convenient control over water usage within each chamber. Additionally, the pressure caused by gravity can affect the health of delicate crustaceans such as soft shell crawfish. The present invention allows for a better control over the directional distribution of gravitational forces on the organism. Horizontal positioning or batch containment does not allow for such control.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
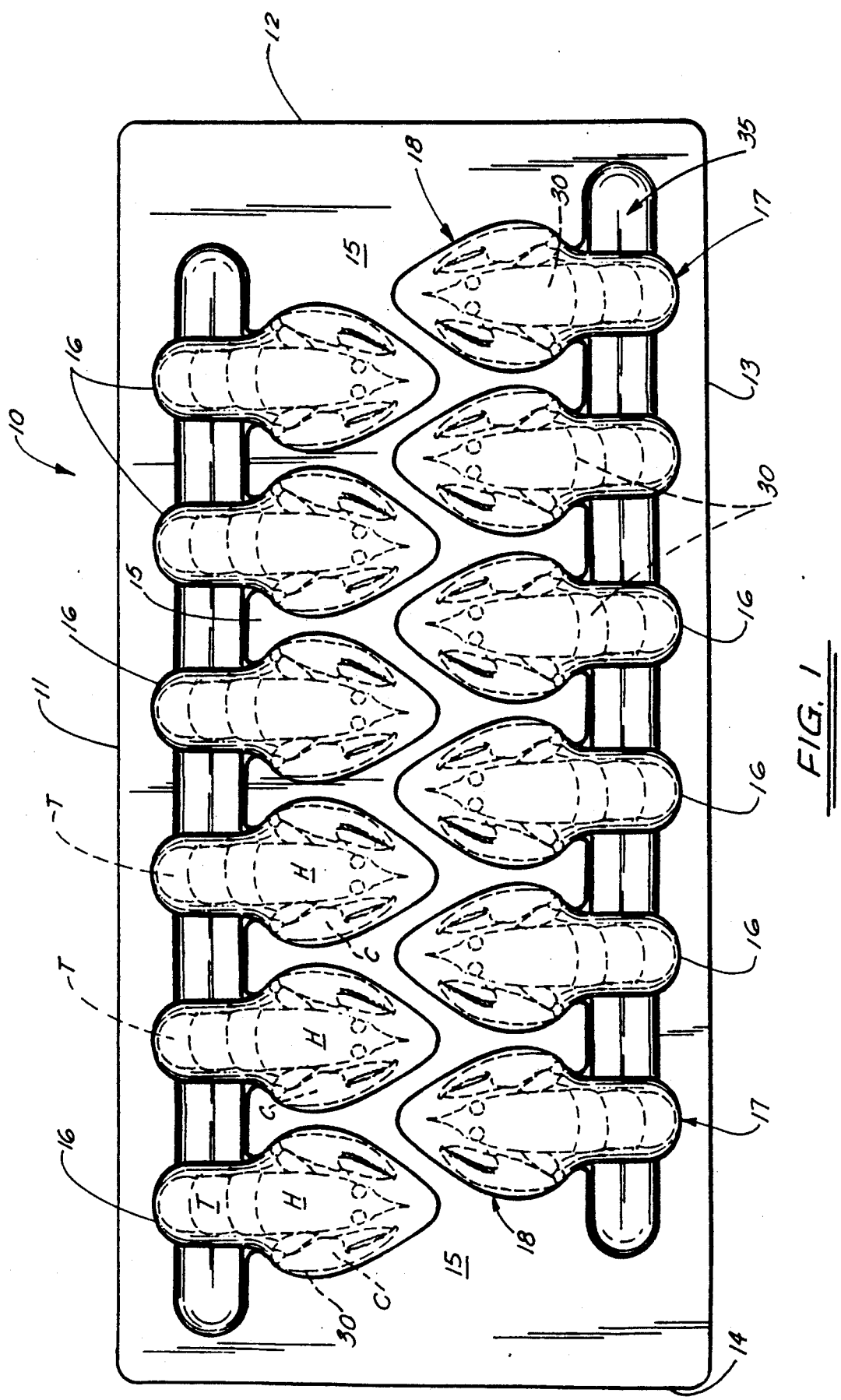
FIG. 1 is a plan view of the preferred embodiment of the apparatus of the present invention.

FIGS. 1-6 show generally the preferred embodiment of the apparatus of the present invention designated generally by the numeral 10. In FIG. 1, there can be seen a package 10 which has peripheral edges 11-14 as defined by a flat planar member 15. The planar member 15 can be for example manufactured as a rigid sheet of plastic having a plurality of sockets 16 therein. The top portion of each socket 16 communicates with the top planar member 15 so that the periphery 19 of each socket 16 has an open top that communicates with the upper surface of the planar member 15. Each socket 16 has a bottom surface 20 that is diagonal in orientation with respect to planar member 15.

Figure 2:
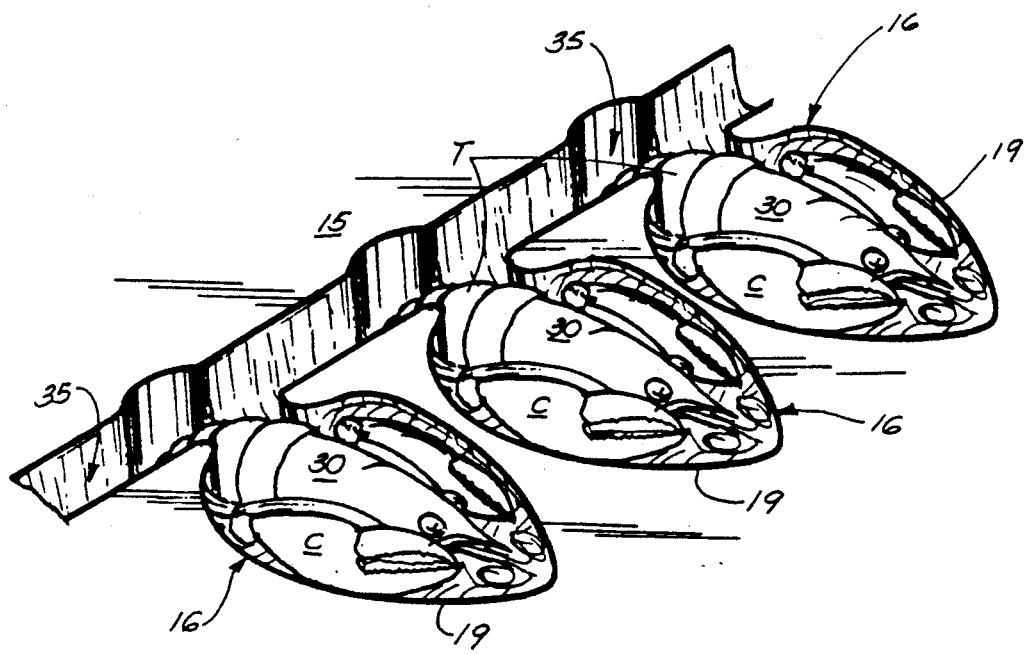
FIG. 2 is a perspective view of the preferred embodiment of the apparatus of the present invention.
Figure 7:
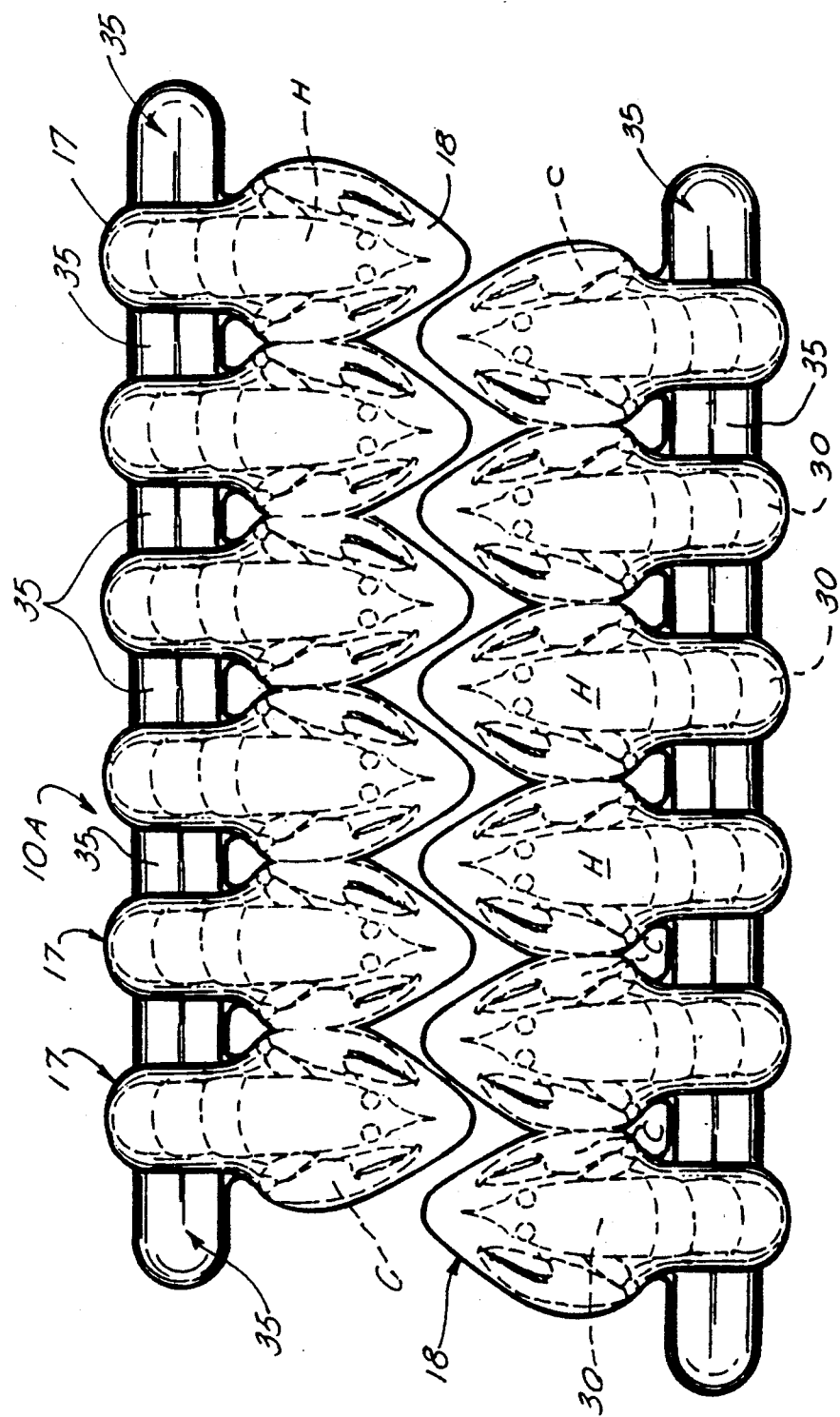
FIG. 7 is a top, plan view of a second embodiment of the apparatus of the present invention.

Sockets 16 each have front end portions 18 which gradually increase in width beginning of front end 21, and tail end portion 17. The end portion 18 of each socket is curved, shaped to conform generally to the head H area of a crawfish 30 when the claws 6 are folded against the head H as seen in FIGS. 1, 2 and 7.

The container 10 can be constructed to include a plurality of peripheral sidewalls or can be placed within a separate box having a plurality of sidewalls which are generally vertical and communicate with the edges 11-14.

A transverse trough member 35 extends between the tail or rear portion 17 of sockets 16 as shown in FIGS. 1-7. The trough 35 has an axis 42 that extends at right angles to the longitudinal axis 40 of socket 16 which is also the longitudinal axis of the crawfish 30 being stored.

Figure 3:
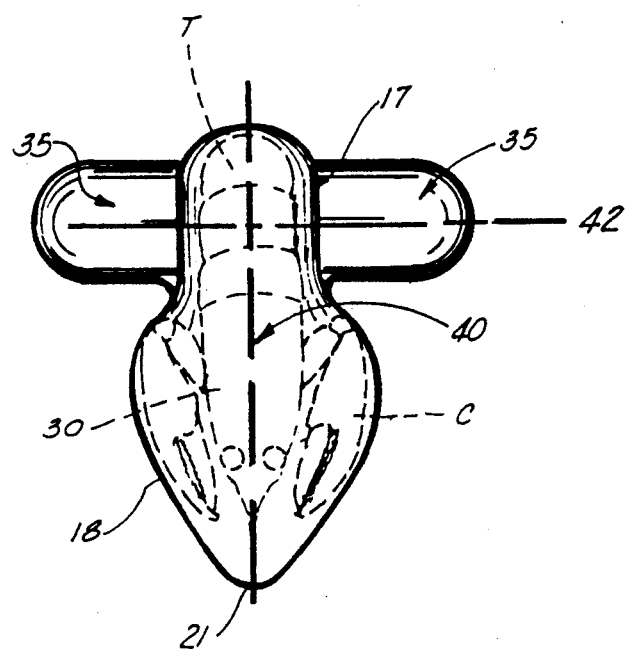
FIG. 3 is a partial view of the preferred embodiment of the apparatus of the present invention.
Figure 4:
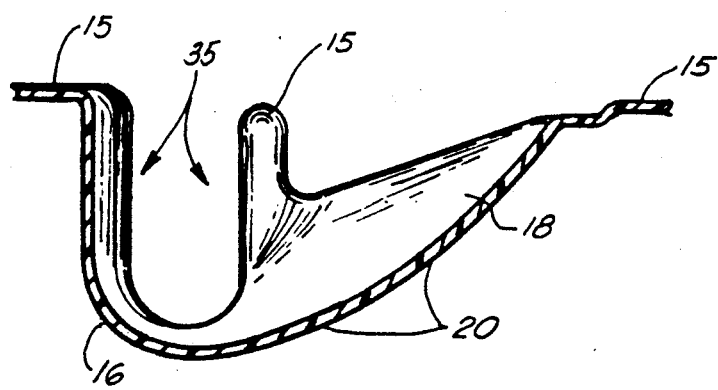
FIG. 4 is a sectional view taken along lines 4—4 of FIG. 1.
Figure 5:
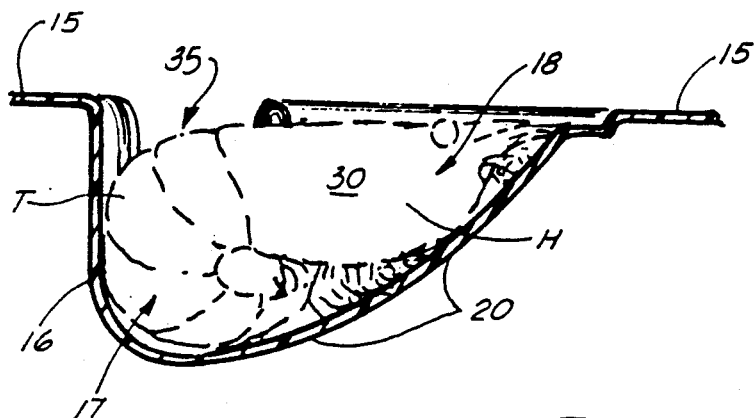
FIG. 5 is a sectional view taken along lines 5—5 of FIG. 3.
Figure 6:
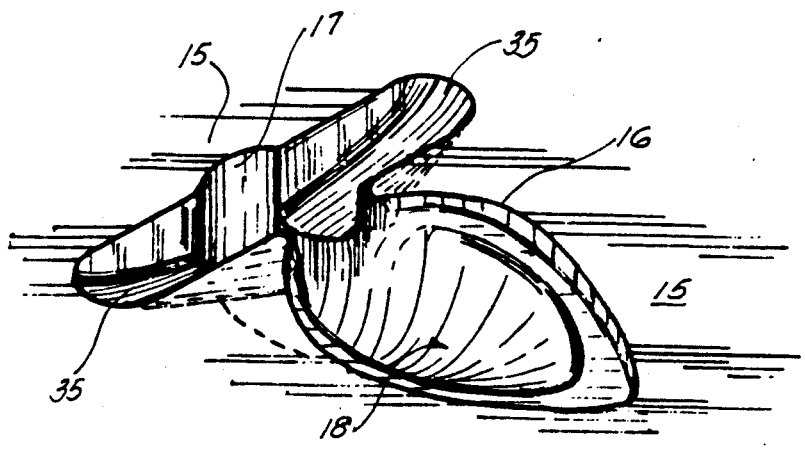
FIG. 6 is a partial perspective view of the preferred embodiment of the apparatus of the present invention.

A crawfish 30 is shown in FIGS. 3 and 5 as occupying a normal contained position within the socket 16. The crawfish 30 includes a posterior or tail portion T, a head or carapace portion H, and a pair of spaced apart left and right claws C.

For containment, the crawfish 30 is placed within each socket 16 as shown in FIGS. 3 and 5. The crawfish 30 are placed within the sockets 16. The posterior tail T portion communicates with and registers into the similarly shaped rear or tail socket portion 17 of each socket 16. The interior has a shape that registers with and conforms to the shape of the tail T of the crawfish when the tail T is curled under the carapace or head H (FIG. 5). The container 10 can include a plurality of weep holes (not shown) which control a level of water contained within each socket 16. Weep holes allow air to communicate with the interior of each socket 16 so that the crawfish can breathe and so that the water can be used to keep the crawfish moist during shipment or storage even when the top plate 15 is covered with the layer of nonporous film. Weep holes can be positioned along the full length of each socket 16 including at the bottom so that no level of water would be retained within the socket 16. The container 10 typically would be sprayed or dipped with water so that the crawfish would remain moist in order to keep them in a live condition.

For removal of a crawfish 30 from the container 10 a user places a thumb and forefinger of one hand into trough 35 and on opposite sides respectively of tail T to grip the crawfish 35. The crawfish is removed easily from the container by lifting upwardly. The trough 35 runs continuously through all sockets 16 at the tail or rear portion 17 thereof.

In the embodiment of FIG. 7 designated as 10A, adjacent sockets 16 actually touch at the front end 18, so that the crawfish claws C of adjacent crawfish 30 touch, thus maximizing the use of space.

The present invention provides an improved shipping or storage container for use with crawfish. The present invention has particular utility to the containment of live and or fresh crawfish for use within the soft shell industry and the fish bait industry. With the present invention, the crawfish can be contained in arrays, yet each crawfish is separated from the other crawfish stored within the tray 10.

The construction of the present invention allows a large number of crawfish to be shipped or stored in a small tray with respect to lateral dimensions so that large numbers of crawfish can be maintained in a relatively small container yet still separate the individual crawfish from one another. Further, the present invention provides an improved construction which allows crawfish to be shipped in a live condition wherein water can be used to wet the crawfish during the shipment or storage.

Further, the present invention provides an improved construction in that the crawfish can be maintained in a protected covered fashion so that the crawfish are not handled or damaged during shipment or storage.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A container for holding live or fresh crawfish, stored with their tails in a folded position, comprising:
   (a) an expansive support member carrying a plurality of sockets;
   (b) each socket having a continuous sidewall conforming generally to the shape of a crawfish, the sockets being spaced apart so that multiple crawfish can be stored within the dimensions of the horizontal member, separate from one another and in a generally co-planar orientation;
   (c) each socket including a longitudinally extending socket that aligns with the longitudinal axis of the crawfish being stored and including a front end portion of gradually increasing width and a rear end portion shaped to be receptive of a crawfish folded tail; and
   (d) a transverse trough, angularly oriented with respect to the crawfish being stored and connecting adjacent sockets at the tail portion so that the thumb and forefinger of a user can grip the crawfish tail by entering the transverse slot.

2. The container of claim 1 wherein each socket is curved concavely and shaped to conform to the tail area of a crawfish when the tail is folded under the crawfish body.

3. The container of claim 1 wherein each socket is configured to support a substantial portion of the crawfish below the upper surface of each socket.

4. The container of claim 1 wherein each socket has a generally diagonally oriented bottom portion.

5. The apparatus of claim 1 wherein the support member has a generally horizontally positioned upper surface.

6. The container of claim 1 wherein the socket front end portion has a tapering shape which conforms to the shape of a crawfish so that the crawfish's legs and claws are held in close proximity to the crawfish body when the crawfish occupies an operative position within the socket.

7. The container of claim 1 further comprising one or openings in adjacent socket sidewalls that allows the crawfish to be touching one another when occupying positions inside adjacent sockets.

8. The container of claim 1 wherein there are at least two rows of sockets facing in opposite directions.

9. The container of claim 8 wherein the front end portion of each socket on one row abuts the front end portion of a socket on another row.

10. The container of claim 9 wherein the front end portions of sockets on the two rows are alternately positioned so that sockets of both rows overlap a line that traverses the center portion of the tray.

* * * * *